Jan. 9, 1934.   E. J. HORNUNG   1,942,600
CLAMP
Filed Sept. 6, 1932

Inventor:
Elias J. Hornung,
By D. Clyde Jones
Attorney.

Patented Jan. 9, 1934

1,942,600

UNITED STATES PATENT OFFICE 1,942,600

CLAMP

Elias J. Hornung, Rochester, N. Y.

Application September 6, 1932. Serial No. 631,821

2 Claims. (Cl. 24—19)

This invention relates to clamps and more particularly to hose clamps.

In commercial types of hose clamps now on the market, it is necessary to insert in or remove a screw or bolt from the clamps in applying it to or removing it from a hose section. However, it has been proposed to employ springs in hose clamps, but the use of such devices has not been successful, since in all prior devices, either the entire length of the spring or a substantial portion thereof has been in engagement with the hose to force it into engagement with the unit to which it is coupled. It will be appreciated that when such a spring is applied as a hose coupling, it is under tension, and therefore, the turns of the spring will be separated so that the entire surface of the hose will not be gripped at its clamping area.

It has also been proposed to provide various latching arrangements for clamps, but in so far as applicant is aware such arrangements have utilized a two-piece clamping band.

In accordance with the present invention it is proposed to provide a clamp in the form of a single piece metal band to engage the entire circumference of the article to be clamped. The ends of said band being in overlapping relation, in which relation they are held in any one of several adjustable positions by suitable latch elements.

In accordance with a further feature of the invention, it is proposed to provide a clamp in the form of a metal band, of sufficient length to engage the entire circumference of the hose at its clamping area, with its ends in overlapping relation, in which position these ends are held by a spring attached to one end of the band and carrying at its other end a locking element which engages parts on the clamping band.

An additional feature of the invention relates to a clamping element for a hose or the like, which is substantially inextensible in the direction of its length but is adapted to be wrapped around the hose section with its ends in overlapping relation, where these ends are held in clamping relation by means of a resilient latch, whereby the clamp may be applied or removed from a hose section without the need of screws or bolts.

Figure 1:
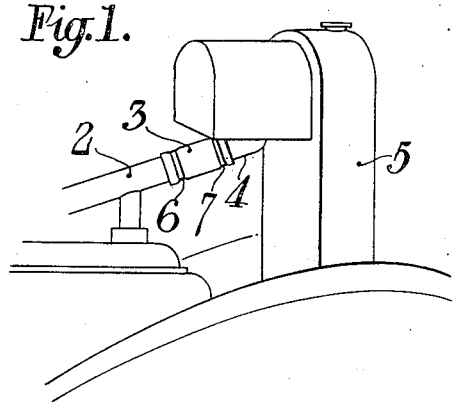
Figure 2:
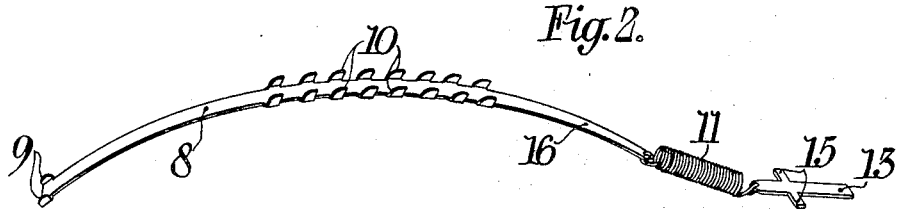
Figure 3:
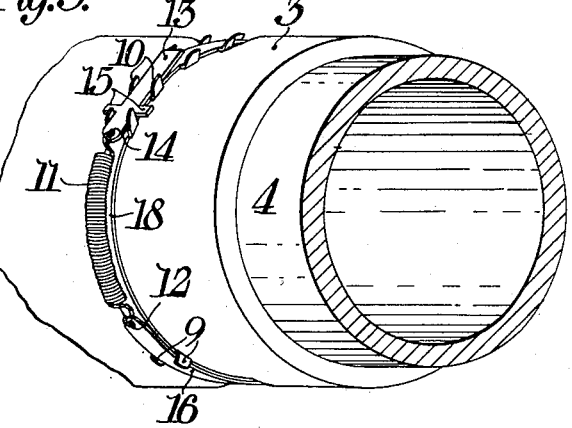
Figure 4:
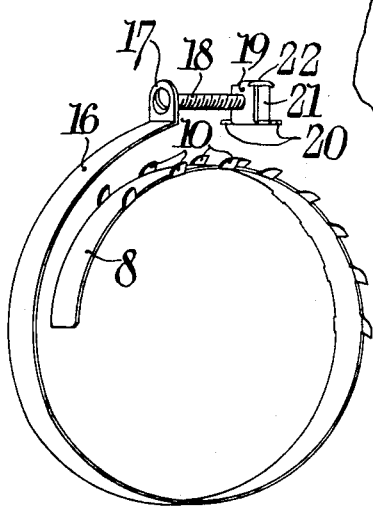

For a clearer understanding of the invention, reference is made to the drawing in which Fig. 1 shows two clamps of the present invention applied to respective ends of a hose section, employed as a part of a circulating system for an internal combustion engine; Fig. 2 is a perspective view of a clamp in extended or open position; Fig. 3 is an enlarged perspective view showing the clamp applied as a hose coupling, and Fig. 4 is a perspective view of a modified form of the invention.

Referring to Fig. 1, 2 designates a metal pipe, such as that forming part of the water circulating system of an internal combustion engine, 3 is a section of flexible hose such as fabric impregnated with rubber, which hose may be connected to a pipe 4 of a radiator 5 of the engine. At points 6 and 7 there are indicated clamps according to the present invention, which clamp the ends of the hose 3 where it telescopically engages the ends of the pipes 2 and 4. It will be understood, however, that the clamp of this invention may be used wherever it is desired to clamp an article in any desired position, altho, it is believed that this device will have particular application as a hose clamp for an internal combustion engine, and for this reason, the invention has been so illustrated in Fig. 1.

The hose clamps indicated at 6 and 7 preferably comprise a band 8 of metal or similar material, which is substantially inextensible in the direction of its length and yet may be wrapped around an article. The band 8 at one end is provided with a pair of integral upstanding ears 9, while intermediate of its ends, there are provided a series of pairs of integral hooks 10, which are inclined away from the ears 9. It will be noted that the hook corners nearest the ears 9 are rounded to facilitate latching of the clamp. At the other end of the band 8 there is attached a coil spring 11, this attachment of the spring to the end of the band being preferably effected by hooking one end of the spring through an opening 12 in the end of the band. At the other end of the spring there is fastened a latch member in the form of a strip 13 having an opening 14 in one end thereof, in which this free end of the spring 11 is hooked. The latch 13 has lateral lugs 15 adapted to engage the hooks 10, as will now be pointed out.

In applying the clamp to an article such as a hose, the band 8 is wrapped around the hose, preferably by placing the portion 16 of the band between the ears 9 thereof, the free end of the latch 13 is then pulled by means of a pair of pliers whereby the spring 11 may be extended until the lugs 15 on the latch are drawn into engagement with a pair of hooks 10, so that all parts of the clamping area of the hose will be tightly engaged by some part of the band 8. Since this band completely encircles the hose it will provide a water tight connection between the hose and the pipe to which it is coupled. Where the device is used as a coupling element for a hose forming a part of the cooling system of an internal combustion engine, it has been found that when the circulating water heats up, the pressure exerted by the clamp is sufficient when the pipe is heated to cause the rubber of the hose to adhesively engage the pipe to which it is connected. Since the clamp includes the spring 11, the clamp will adjust itself to the expansion and contraction of the pipe to which the hose is coupled, thereby insuring a water tight seal at all times.

In the modified form of the invention shown in Fig. 4, the band 8 with the pairs of upstanding hooks 10, is employed. However, the end of the portion 16 of this band, is formed with an apertured upstanding lug 17, adapted to receive an adjusting element or bolt 18. This bolt 18 carries a latch element 19 having lugs extending generally in a plane at right angles to plane of the main portion of this element. It will be understood that these lugs are properly proportioned to engage any pair of hooks 10 on the band 8. As herein shown, the adjusting element is in the form of a bolt 18 engaging a nut 21, however, it will be understood that instead of using such a nut, the opening in the element 19 may be threaded to engage the bolt. As illustrated, the latch element has an angular extension 22 to engage one edge of the nut 21. This extension 22 as well as the lower edge of the element 19 forming a part of the lugs 20, prevent the nut 21 from turning independently of the latch element. If desired, the free end of the bolt 18 may be riveted so that the nut 21 cannot be easily removed therefrom.

In applying this clamp to a hose or other article, the band 8 is wrapped around the article with the portion 16 thereof lying between certain of the pairs of hooks 10. The latching element may then be drawn until the lugs 20 thereof engage a pair of hooks 10 so that the clamp snugly fits the hose or the article to be clamped, thereafter, the bolt 18 is tightened by a screw driver until the clamp grips the hose with the desired degree of tightness.

What I claim is:

1. In an article of the class described, a band formed of a single piece of flexible material substantially inextensible in the direction of its length, said band having a series of pairs of hooks struck up from its edges intermediate its ends, a latching member having lugs to engage any of said pairs of hooks and to hold the ends of said band in overlapping relation, and a spring connecting said latch member to said band near one end thereof.

2. In an article of the class described, a band formed of a single piece of flexible material substantially inextensible in the direction of its length, said band having pairs of hooks intermediate its ends and a pair of upstanding members to guide one end of said band in overlapping relation to the other end thereof, a latch member having lugs to engage any of said pairs of hooks and a spring connecting said latch to said band.

ELIAS J. HORNUNG.